United States Patent [19]
Janssen et al.

[11] Patent Number: 5,174,929
[45] Date of Patent: Dec. 29, 1992

[54] PREPARATION OF STABLE POLYVINYL ALCOHOL HYDROGEL CONTACT LENS

[75] Inventors: Robert A. Janssen, Alpharetta, Ga.; Ping I. Lee, Oakville, Canada; Ellen M. Ajello, Decatur, Ga.

[73] Assignee: Ciba-Geigy Corporation, Ardsley, N.Y.

[21] Appl. No.: 576,624

[22] Filed: Aug. 31, 1990

[51] Int. Cl.$^5$ .............................................. B29D 11/00
[52] U.S. Cl. .................................... 264/2.6; 523/106; 264/1.1; 264/1.4
[58] Field of Search ..................... 524/388, 503, 557; 523/106; 264/1.1, 2.6, 2.7

[56] References Cited

U.S. PATENT DOCUMENTS

| | | | |
|---|---|---|---|
| 3,408,423 | 7/1966 | Friedman | 525/43 |
| 4,469,837 | 9/1984 | Cattaneo | 524/388 |
| 4,559,186 | 12/1985 | Lee | 264/2.1 |
| 4,619,793 | 10/1986 | Lee | 264/2.6 |
| 4,874,562 | 10/1989 | Hyon | 264/1.4 |
| 4,966,924 | 10/1990 | Hyon et al. | 523/106 |

Primary Examiner—Joseph L. Schofer
Assistant Examiner—J. M. Reddick
Attorney, Agent, or Firm—Edward McC. Roberts; William G. Hervey

[57] ABSTRACT

A dimensionally stable hydrogel contact lens of polyvinyl alcohol having an equilibrium water content of between about 70 to about 80 weight percent, based upon the total swollen lens weight, said lens having been annealed in a mold essentially conforming to the contact lens dimensions under substantially ambient non-drying setting conditions in the presence of an aqueous-organic annealing promoter solvent, for a period of time substantially sufficient to reach annealing equilibrium.

4 Claims, No Drawings

PREPARATION OF STABLE POLYVINYL ALCOHOL HYDROGEL CONTACT LENS

BACKGROUND OF THE INVENTION

This invention relates to polyvinyl alcohol soft contact lenses and their use, which have been annealed under substantially ambient conditions in the presence of an annealing promoter solvent. This invention further relates to a process for producing annealed shaped polyvinyl alcohol hydrogels useful for contact lenses.

Polyvinyl alcohol films and gels have been reported as ophthalmic inserts, e.g. in the lower conjunctival sac when imbibed with pharmaceuticals such as tetracycline, pilocarpine, atropine and the like. Such materials are generally in the form of a crosslinked film or gel. See, for example, Y. F. Maichuk, Ophthalmic Drug Inserts, *Invest. Ophthalmol.*, Vol. 14, pages 87–90 (1975); D. W. Lamberts, Solid Delivery Devices, *Int. Ophthalmol. Clininc*, Vol. 20, No. 3, pages 68–69 (1980); and Y. E. Maichuk, *Antibiotik*, Vol. 12, No. 4, pages 432–5 (1967). In U.S. Pat. No. 3,408,423, polyvinyl alcohol crosslinked with glyoxal has been proposed as a hydrogel contact lens material. In U.S. Pat. No. 4,559,186, hydrogel contact lens materials crosslinked with a borate is described. In U.S. Pat. No. 4,619,793, polyvinyl alcohol is annealed to increase the crystallinity thereof and swollen in a swelling solvent. Such annealing is conducted, inter alia, by evaporation of an aqueous or aqueous/plasticizer polyvinyl alcohol gel, by high pressure stress induced crystallization of solid state polyvinyl alcohol, or by thermally annealing optionally plasticized polyvinyl alcohol at elevated temperatures, in each case to form a polyvinyl alcohol at elevated temperatures, in each case to form a polyvinyl alcohol lens replica and then swelling the replica in a swelling solvent, such as water, to form the swollen hydrogel lens. Because the final lenses are swollen, the configuration of the annealed lens replica, for example, must be calculated based upon the predicted extent of swelling which occurs subsequent to the lens replica step. In U.S. Pat. No. 4,874,562, there is exemplified a method of crystallizing a polyvinyl alcohol aqueous/organic solvent solution by cooling the solution to 0° C. or less, preferably about −20° C., to crystallize out the polyvinyl alcohol and immersing the resulting gel in water. However, such gels generally undergo a size change of about 15 to about 30 percent when solvents are exchanged with water or a saline solution.

It is an object of the present invention to provide contact lenses of polyvinyl alcohol gels which can be economically prepared in molds which substantially conform to contact lens dimensions when worn by the patient.

It is further object of the present invention to provide processes for the preparation of such lenses.

It is further object of the present invention to provide a method of correcting vision in patients in need of the same by wearing such a lens on the surface of the cornea.

DETAILED DESCRIPTION OF THE INVENTION

The present invention provides dimensionally stable hydrogel contact lenses of polyvinyl alcohol having an equilibrium water content of between about 70 to about 80 weight percent, based upon the total swollen lens weight, said lens having been annealed in a mold essentially conforming to the contact lens dimensions, under substantially ambient non-drying setting conditions in the presence of an aqueous organic annealing promoter solvent, for a period of time substantially sufficient to reach annealing equilibrium.

Preferably, the polyvinyl alcohol has a weight average molecular weight of at least about 10,000. As an upper limit, the polyvinyl alcohol may have a weight average molecular weight of up to 1,000,000. Preferably the polyvinyl alcohol has a weight average molecular weight of up to 300,000.

Polyvinyl alcohol is ordinarily prepared by hydrolysis of the corresponding polyvinyl acetate. In a preferred embodiment, the polyvinyl alcohol contains less than 1 mole percent of the polyvinyl acetate units.

Ordinarily, polyvinyl alcohol predominantly possesses a poly(2-hydroxy)ethylene structure. However, the polyvinyl alcohol starting material may also contain a minor account of hydroxyl groups in the form of 1,2-glycols, such as copolymer units of 1,2-dihydroxyethylene in the chain obtained for example, by alkaline hydrolysis of vinyl acetate-vinylene carbonate copolymers. Advantageously, such a copolymer contains less than 20 mole % of such units, preferably less than 10 mole % of such units.

Moreover, the polyvinyl alcohol may contain minor amounts of copolymer units of ethylene, propylene, acrylamide, methacrylamide, dimethacrylamide, hydroxyethylmethacrylate, methyl methacrylate, methyl acrylate, ethyl acrylate, vinyl pyrrolidone, hydroxyethylacrylate, allyl alcohol, and the like. Preferably, the polymer should contain not more than 5 mole % of units other than those of vinyl alcohol. Most preferably, the polyvinyl alcohol contains less than 1 mole % of such copolymer units.

Commercial polyvinyl alcohol resin may be used, such as ELVANOL 71-30 manufactured by DuPont, or Vinol 125 manufactured by Air Products, Inc.

Preferably, the polyvinyl alcohol to be annealed is substantially insoluble in water up to 50° C., most preferably up to 60° C.

The aqueous/organic annealing promoter solvent may be a liquid organic annealing promoter solvent or an aqueous-organic solvent solution containing water and the organic annealing promoter. It has been found that conventional plasticizers and aqueous solutions thereof serve as excellent annealing promoters. Suitable promoters include polyols, such as ethylene glycol, propylene glycol and glycerine; amines, such as pyridine, trimethylamine and ethanolamine; ethers, such as ethylene glycol mono- and di-methyl ether; polyalkylene glycols, such as polyethylene glycol; tetrahydrofuran, formamide, dimethylformamide, dimethylsulfoxide or in aqueous solution, ethanolamine salts including triethanolamine acetate and triethanolamine hydrochloride, and the like. The amount of promoter employed will depend upon the nature of the particular promoter chosen and will affect the period of time required to reach substantial annealing equilibrium. Accordingly, while one may use a solution of consisting soley of promoter, it is generally convenient to employ an aqueous solution of promoter, preferably containing at least about 5 weight percent, more preferably at least about 10 weight percent, promoter and the remainder water. In order to avoid the necessity of removing residual amounts of promoter, it is preferable to employ a substantially non-toxic promoter, such as glycerine, polyethylene glycol or mixtures thereof. Also, high amounts of some promoters, such as glycerine, may result in the lens having a hazy appearance. This can be obviated by diluting the promoter with water, if necessary.

Substantially ambient conditions are generally employed, preferably a temperature of between about 10° to about 40° C., more preferably between about 15° to about 30° C.

While the amount of time required for the polyvinyl alcohol gel to substantially reach annealing equilibrium will vary depending upon the exact conditions employed, such equilibrium is ordinarily reached between about 20 hours and about 45 days. At substantial annealing equilibrium, additional storage has little effect on the lens water content upon placement in an aqueous saline solution, as evidenced by the appended examples.

Casting solutions, containing the polyvinyl alcohol, optionally water, and the annealing promoter are placed into the mold and allowed to set. Such solutions generally contain about 18 to 35% polyvinyl alcohol, preferably about 18 to about 30% by weight polyvinyl alcohol, and most preferably about 18 to about 25% by weight polyvinyl alcohol.

In a preferred embodiment, the casting solution contains between about 10% and 60% by weight annealing promoter, preferably glycerine, about 18 to about 30% by weight polyvinyl alcohol, and the remainder water.

The casting solution is conveniently prepared by combining the polyvinyl alcohol, annealing promoter and water, preferably at elevated temperature e.g. between about 50° to about 120° C. to promote dissolution of the polyvinyl alcohol to obtain a clear solution. The solution is then placed in a contact lens mold preferably at a temperature between about 100° C. to ambient temperature which substantially conforms to the shape and size of the desired contact lens as equilibriated in a contact lens saline solution, and allowing the solution to set at ambient temperature until annealing equilibrium is substantially reached. As the lens at substantial annealing equilibrium is approximately of the same dimension, e.g. within about 1 to about 3% based upon lens water content of saline swollen lens, the molds may conveniently be the same size as the desired lens final product. The molds are generally polypropylene, polystyrene or polycarbonate or combination of each, and may optionally be treated with a conventional release agent. After the lens is annealed, it is removed from the mold, washed with an aqueous solution, such as water or a saline solution, to remove the promoter, and placed in a saline solution for storage.

During the annealing process, the solution is transformed to the dimensionally stable gel. In order to prevent the collapse of the gel structure during the setting up of the gel it is important that no substantial drying of the gel occur as this may adversely affect the size and properties of the final lens product. This objective can be most conveniently achieved by placement of the solution in a closed, or substantially closed, system, or alternatively by adjusting the vapor pressure above the solution so as to substantially inhibit evaporation of the solvent system.

If desired, the lens may be sterilized by irradiating the same at a radiation strength of between about 2 to about 6 Mrads. While some crosslinking may occur, the radiation does not substantially affect the water content or dimensional strength properties of the lens, other than increasing the thermal resistance of the irradiated lens.

The following examples are set forth for illustrative purposes only and are not intended to limit the invention. All parts are by weight unless otherwise indicated.

EXAMPLE 1

Twenty grams of 99-100 mole % hydrolyzed polyvinyl alcohol (ELVANOL ® 71-30, manufactured by DuPont) is blended with 35 grams glycerine and 45 grams of distilled water to form a slurry. The slurry is then heated in a piston-barrel dispenser to a final temperature of 110° C. which is held for 18 hours. This results in a clear molten-gel material. The molten material is allowed to cool to 90° C. from which it is then dispensed into polypropylene molds which generated the shape of a contact lens.

The filled molds are then stored at room temperature (22° C.) in a clamping fixture so as to retain the shape of the lens.

Lens molds are then opened at specific annealing times up to a total time of 3 days. The lenses are removed from the molds and placed in a phosphate buffered saline solution to remove the glycerine. Water contents of the lenses are then obtained by weighing the lens wet and dry. Table 1 summarizes the results:

| Mold Storage Time | Lens Water Content |
| --- | --- |
| 1 hour | 91% |
| 2 hours | 86% |
| 24 hours | 79% |
| 48 hours | 78% |
| 72 hours | 79% |

The lens, when annealed to its equilibrium value, generates a lens with an approximate water content of 79%. The annealing time to reach this equilibrium state is approximately 24 hours.

EXAMPLE 2

A polyvinyl alcohol molten gel is then prepared as per Example 1. Polypropylene lens molds are then filled with the gel and allowed to anneal for 5 days at 22° C. At the conclusion of this annealing time the lenses are removed from the molds, extracted with phosphate buffered saline and gamma irradiated to a total dosage range of 2.5 to 4.0 Mrads while in the saline solution. The following table summarizes the properties of the resulting lenses.

| | |
| --- | --- |
| Water content: | 80.2% |
| Youngs Modules: | $86 \times 10^5$ dynes/cm$^2$ |
| Tensile Strength: | $200 \times 10^5$ dynes/cm$^2$ |
| Elongation at Break: | 389% |
| Dissolved Oxygen Permeability at 34° C. | $40.7 \times 10^{10} \dfrac{cm^3 \ mm}{cm^2 \ sec \ mmHg}$ |

Twenty-five grams of Elvanol ® 71-30 (99-100 mole % hydrolyzed polyvinyl alcohol manufactured by DuPont) is blended with 25 g glycerine and 50 g deionized water. The slurry is placed in a piston barrel dispensor and slowly heated to 110° C. and held at that temperature for 18 hours. The clear molten gel is dispensed at 90° C. into polypropylene molds held in place in a clamping fixture at room temperature (22° C.) for two weeks to retain the shape of a contact lens. Lenses are removed from the fixtures each day and the water content evaluated. This data is summarized in Table 1.

TABLE 1

| Storage Time | H₂O Content (percentage) |
|---|---|
| 1 hour | 95 |
| 6 hours | 89 |
| 9 hours | 84 |
| 24 hours | 78 |
| 46 hours | 75 |
| 3 days | 74 |
| 8 days | 74 |
| 14 days | 74 |

A contact lens with an approximate water content of 74% is generated after 3 days of annealing at 22° C.

EXAMPLE 4

A molten PVA gel is prepared according to Example 3. The molds are allowed to anneal at room temperature (22° C.) for 5 days. The lenses are removed from the molds and extracted in phosphate buffered saline. After extraction the lenses are placed in glass vials filled with phosphate buffered saline and gamma irradiated to a dosage range of 2.5–4.0 Mrads.

The test results of the lenses are summarized in Table 2.

TABLE 2

| Parameter | Gel Composition (wt.) |
|---|---|
|  | PVA 25 |
|  | Glycerin 25 |
|  | Water 50 |
| Water content: | 76.3% |
| Youngs Modules: | 117 × 10⁵ dynes/cm² |
| Tensile Strength: | 246 × 10⁵ dynes/cm² |
| Elongation at Break | 395% |
| Dissolved Oxygen Permeability at 34° C. | $25.4 \times 10^{10} \frac{cm^3 \; mm}{cm^2 \; sec \; mmHg}$ |

EXAMPLE 5

Twenty five grams of Elvanol® 71–30 is blended with 12.5 grams of polyethylene glycol of molecular weight 600 and 12.5 grams of glycerine and 50 grams of deionized water. The material is heated to a temperature of 105° C. for 18 hours, cooled to 90° C. and dispensed into polypropylene molds.

The molds are stored at 22° C. and lenses are removed from the molds at predetermined intervals. The lenses are then placed in phosphate buffered saline from which its water contents are determined. The following table summarizes the results:

| Mold Storage Time | Lens Water Content |
|---|---|
| 5 hours | 81% |
| 24 hours | 76% |
| 48 hours | 76% |
| 72 hours | 74% |

The data shows that the addition of polyethylene glycol to the composition of Example 3 reduces the annealing time from 3 days to about 1 day.

EXAMPLE 6

Patterned after Example 3, the 50 g deionized water is replaced with 50 g phosphate buffered saline. The data is summarized in Table 3.

TABLE 3

| Storage Time | H₂O Content (percent) |
|---|---|
| 24 hours | 77 |
| 48 hours | 74.5 |
| 72 hours | 74 |
| 96 hours | 74 |

As with Example 3, the same water content was produced in the contact lens after approximately 3 days of annealing.

What is claimed is:

1. A method of preparing a dimensionally stable contact lens of polyvinyl alcohol having an equilibrium water content of between 70 to about 80 weight percent, based upon the swollen lens weight, comprising providing a casting solution containing about 18 to about 35% polyvinyl alcohol in an aqueous-organic annealing promoter solvent, placing said solution in a mold essentially conforming to the final contact lens dimensions under substantially ambient non-drying setting conditions for a period of time sufficient to reach annealing equilibrium, removing the annealed lens from the mold, removing the organic annealing promoter solvent by washing the lens with an aqueous solution, and recovering the contact lens.

2. A method according to claim 1 wherein the lens is annealed at a temperature between about 15° C. to about 30° C. for between about 20 hours and about 45 days.

3. A method according to claim 2, wherein the casting solution consists essentially of about 10% to about 60% by weight annealing promoter, about 18 to about 30% by weight polyvinyl alcohol and the remainder water.

4. A method according to claim 3, wherein the promoter is glycerine.

* * * * *